(12) United States Patent
Yun et al.

(10) Patent No.: US 7,398,655 B2
(45) Date of Patent: Jul. 15, 2008

(54) VIBRATION ISOLATION APPARATUS FOR WINE REFRIGERATOR

(75) Inventors: Young-Hoon Yun, Daegu (KR); Yong-Gu Kim, Seoul (KR); Tae-Hee Lee, Seoul (KR); Dong-Hoon Lee, Incheon (KR)

(73) Assignee: LG Electronics Inc., Seoul (KR)

( * ) Notice: Subject to any disclaimer, the term of this patent is extended or adjusted under 35 U.S.C. 154(b) by 6 days.

(21) Appl. No.: 11/030,888

(22) Filed: Jan. 10, 2005

(65) Prior Publication Data

US 2005/0257554 A1    Nov. 24, 2005

(30) Foreign Application Priority Data

May 18, 2004    (KR)    ............ 10-2004-0035356

(51) Int. Cl.
    *F25D 19/00*    (2006.01)
(52) U.S. Cl. .................. 62/295; 181/403; 417/312
(58) Field of Classification Search .......... 62/295; 181/403, 207, 209; 417/312
    See application file for complete search history.

(56) References Cited

U.S. PATENT DOCUMENTS

| | | |
|---|---|---|
| 2,117,919 A | 5/1938 | Summers |
| 2,247,904 A | 7/1941 | Brace |
| 2,666,302 A | 1/1954 | Philipp |
| 3,250,461 A | 5/1966 | Parker |
| 5,070,708 A | 12/1991 | Malosh et al. |
| 5,306,121 A | 4/1994 | Heflin et al. |

FOREIGN PATENT DOCUMENTS

| | | |
|---|---|---|
| CH | 228 747 A | 9/1943 |
| GB | 554 885 A | 6/1943 |
| JP | 58-137633 A | 8/1983 |

*Primary Examiner*—William E Tapolcai
(74) *Attorney, Agent, or Firm*—Birch, Stewart, Kolasch & Birch, LLP

(57) ABSTRACT

Disclosed is a vibration isolation apparatus for a wine refrigerator including a main body having a storage chamber and a mounting space, a base plate disposed at the mounting space of the main body with a predetermined interval from the main body, for forming the mechanical chamber with the mounting space, a compressor being installed on the top surface of the base plate, and an interval maintaining elastic support means coupled between the main body and the base plate, for maintaining a predetermined interval between the main body and the base plate, and elastically supporting the base plate. The vibration isolation apparatus for the wine refrigerator can store wines without deteriorating the special taste of the wines, by preventing the wine bottles stored in the wine refrigerator from being shaken in the operation of the wine refrigerator.

11 Claims, 6 Drawing Sheets

VIBRATION ISOLATION APPARATUS FOR WINE REFRIGERATOR

BACKGROUND OF THE INVENTION

1. Field of the Invention

The present invention relates to a wine refrigerator, and more particularly to, a vibration isolation apparatus for a wine refrigerator which can prevent wine bottles stored in the wine refrigerator from being shaken in the operation of the wine refrigerator.

2. Description of the Background Art

In general, a refrigeration cycle system is mounted inside a refrigerator. An evaporator composing the refrigeration cycle system generates cool air. The cool air is circulated inside the refrigerator, for cooling the refrigerator.

Refrigerators can be classified into various shapes according to structural properties. Also, various types of refrigerators have been developed according to kinds of stored foods.

Recently, a cosmetics refrigerator and a wine refrigerator for storing cosmetics and wines in an optimum state have been developed.

Similarly to the general refrigerator, the wine refrigerator includes a main body having a storage chamber for storing wines, and a door mounted on one side of the main body, for opening or closing the storage chamber.

A refrigeration cycle system is formed in the main body. A compressor and a condenser of the refrigeration cycle system that generate vibration noise and heat are mounted on a mechanical chamber disposed at the lower portion of the main body.

Figure 1:
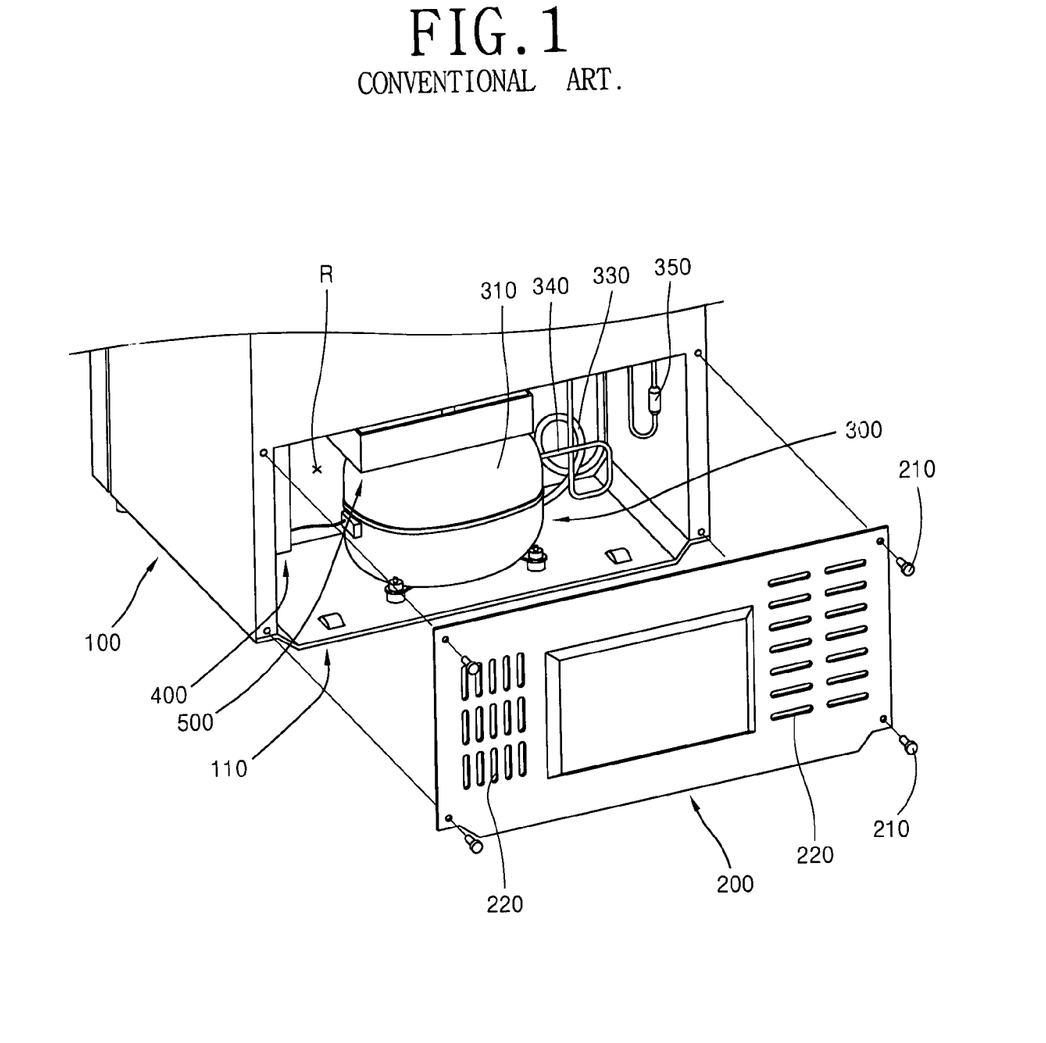
FIG. 1 is a perspective view illustrating disassembly of a mechanical chamber of a conventional wine refrigerator.
Figure 2:
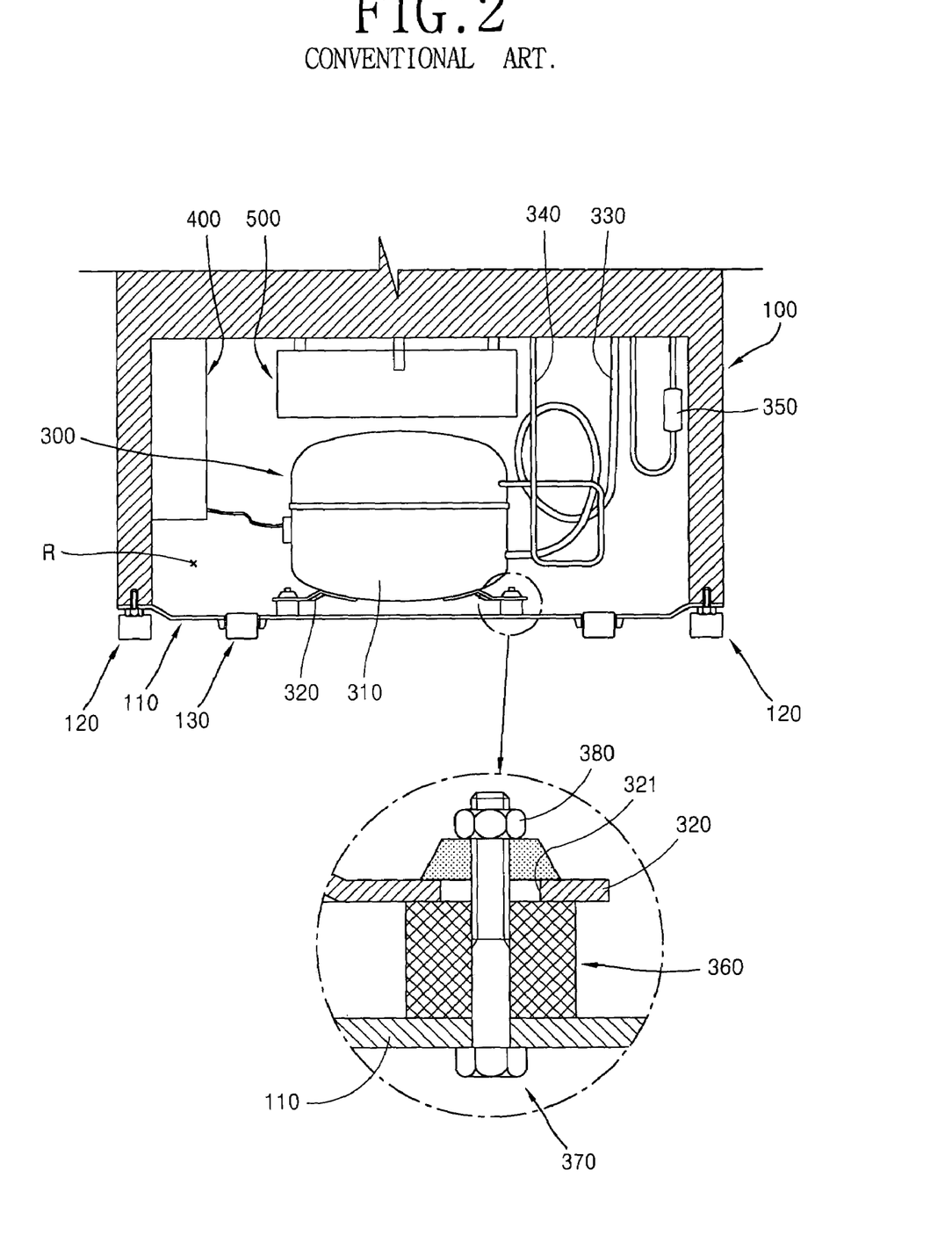
FIG. 2 is a cross-sectional view illustrating the mechanical chamber of the conventional wine refrigerator.

FIG. 1 is a perspective view illustrating disassembly of the mechanical chamber of the conventional wine refrigerator, and FIG. 2 is a front-sectional view illustrating the mechanical chamber of the conventional wine refrigerator.

Referring to FIGS. 1 and 2, in the mechanical chamber, a predetermined size of mounting space R is formed at a bottom rear portion of a main body 100, a predetermined area of bottom plate 110 is fastened to the bottom surface of the main body 100 by using a plurality of screws, and a cover 200 for covering the rear portion of the mounting space R is coupled to the bottom rear surface of the main body 100 by using a plurality of screws 210. The bottom plate 110 covers the bottom surface of the mounting space R of the main body 100.

A compressor 300 is installed on the bottom plate 110 to be positioned inside the mechanical chamber, a control box 400 is mounted on the sidewall of the mechanical chamber, and a defrosted waterspout 500 is installed on the inside top surface of the mechanical chamber to be positioned over the compressor 300. Water generated by frost molten in an evaporator (not shown) is collected in the defrosted waterspout 500 and evaporated.

The compressor 300 includes an airtight vessel 310, and a plurality of mounting plates 320 coupled to the bottom surface of the airtight vessel 310. A suction pipe 330 and a discharge pipe 340 for sucking and discharging refrigerants are connected respectively to the airtight vessel 310. The suction pipe 330 is connected to the evaporator, and the discharge pipe 340 is connected to a condenser (not shown) composing the refrigeration cycle system.

The structure of installing the compressor 300 on the bottom plate 110 will now be explained.

Through holes 321 are formed on the mounting plates 320 of the compressor 300, and through holes 111 corresponding to the through holes 321 of the mounting plates 320 are formed on the bottom plate 110. Cylindrical rubber vibration isolators 360 having a predetermined length are positioned between the bottom plate 110 and the mounting plates 320. Fixing bolts 370 are inserted into the through holes 111 of the bottom plate 110, the rubber vibration isolators 360 and the through holes 321 of the mounting plates 320, and nuts 380 are fastened to the fixing bolts 370. Accordingly, the mounting plates 320 and the rubber vibration isolators 360 are fixedly coupled to the bottom plate 110.

Two front legs 120 for supporting the main body 100 are coupled to the front edges of the bottom plate 110 mounted on the bottom surface of the main body 100, and two rear legs 130 for supporting the main body 100 are coupled to the rear portion of the bottom plate 110 at predetermined intervals. The front legs 120 can control height, and the rear legs 130 that are rollers can easily transport the refrigerator. The front legs 120 and the rear legs 130 contact the bottom surface on which the refrigerator is put, for supporting the refrigerator.

Reference numerals 350 and 220 denote a dryer and air vent holes, respectively.

In the operation of the refrigerator, when the compressor 300 sucks, compresses and discharges refrigerants, vibration noise and heat are generated. The heat generated by the compressor 300 is emitted through the air vent holes 220 of the cover 200. The vibration generated by the compressor 300 is slightly absorbed by the rubber vibration isolators 360. However, since the rubber vibration isolators 360 are disposed to directly contact the mounting plates 320 of the compressor 300 and the bottom plate 110, the vibration is transmitted to the bottom plate 110 through the rubber vibration isolators 360. Because the bottom plate 110 is coupled to the main body 100 through the plurality of screws, the vibration transmitted to the bottom plate 110 is directly transmitted to the main body 100. As a result, the bottom plate 110 and the main body 100 are vibrated, to cause vibration noise.

In general, wines are ripen in wine bottles. To preserve the special taste of the wines, the wines must be carefully handled and stored. Especially, temperature, sunlight, humidity, vibration and horizontality must be taken into consideration to handle and store wine bottles.

In the development procedure of the wine refrigerator, it is quite easy to control sunlight, humidity and horizontality but difficult to maintain an optimum temperature of the wine bottles and intercept vibration. Thus, researches have still been made on it.

In the case of the wine refrigerator described above, since the vibration generated by the mechanical chamber is transmitted to the main body 100, the wine bottles stored in the storage chamber of the main body 100 are more or less shaken. Accordingly, the special taste of the wines is deteriorated.

SUMMARY OF THE INVENTION

Therefore, an object of the present invention is to provide a vibration isolation apparatus for a wine refrigerator which can prevent wine bottles stored in the wine refrigerator from being shaken in the operation of the wine refrigerator.

To achieve these and other advantages and in accordance with the purpose of the present invention, as embodied and broadly described herein, there is provided a vibration isolation apparatus for a wine refrigerator, including: a main body having a storage chamber and a mounting space; a base plate disposed at the lower portion of the mounting space of the main body with a predetermined interval from the main body, for forming the mechanical chamber with the mounting space, a compressor being installed on the top surface of the base plate; and an interval maintaining elastic support means coupled between the main body and the base plate, for maintaining a predetermined interval between the main body and the base plate, and elastically supporting the base plate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
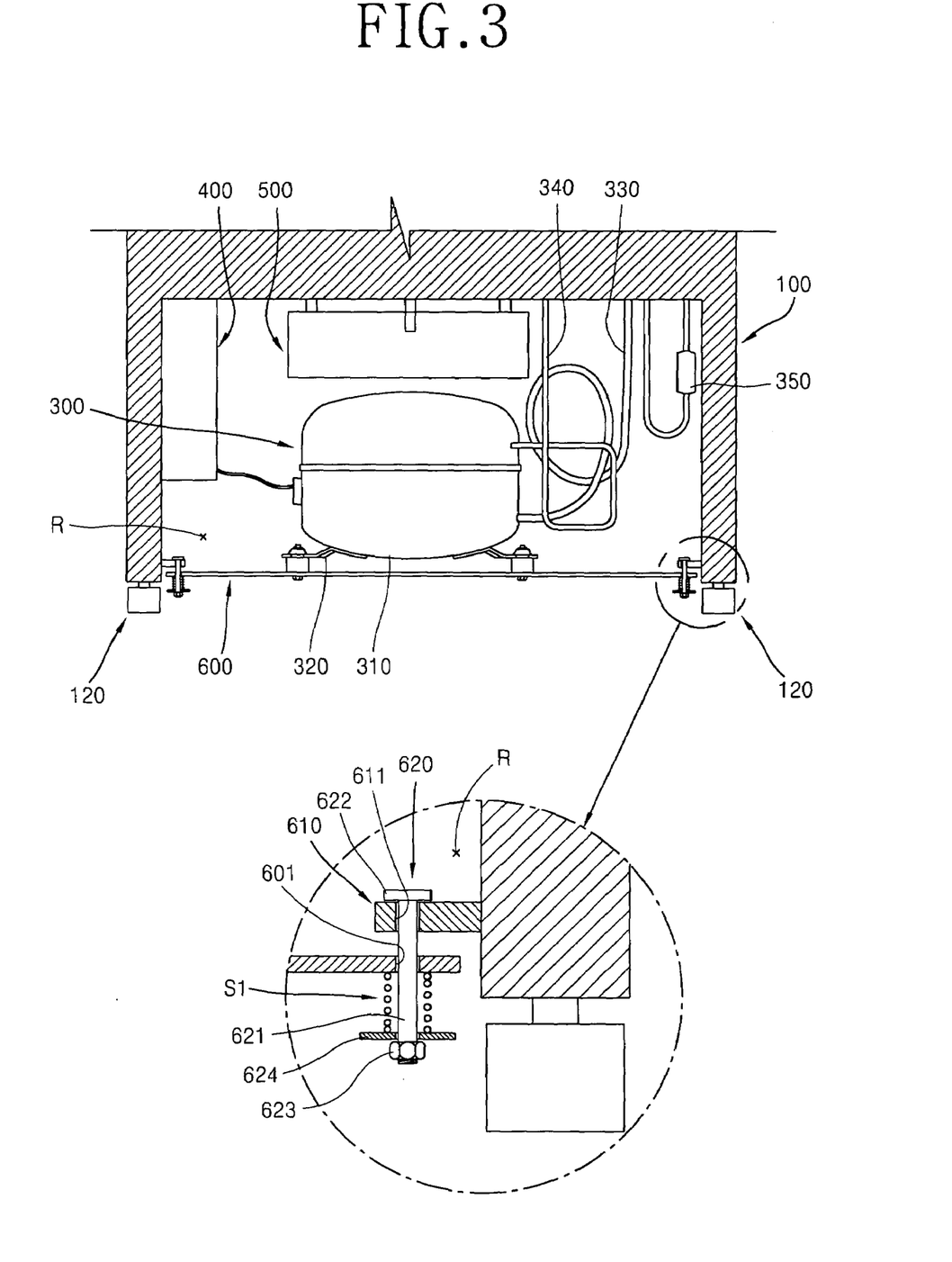
FIG. 3 is a cross-sectional view illustrating a lower portion of a wine refrigerator including a vibration isolation apparatus in accordance with the present invention.

FIG. 3 is a cross-sectional view illustrating a lower portion of a wine refrigerator including a vibration isolation apparatus in accordance with the present invention. In the following description, same drawing reference numerals are used for the same elements even in different drawings.

As illustrated in FIG. 3, the vibration isolation apparatus for the wine refrigerator includes a main body 100 having a storage chamber (not shown) and a mounting space R, a base plate 600 disposed at the lower portion of the mounting space R of the main body 100 with a predetermined interval from the main body 100, for forming the mechanical chamber with the mounting space R, a compressor 300 being installed on the top surface of the base plate 300, and an interval maintaining elastic support means coupled between the main body 100 and the base plate 600, for maintaining a predetermined interval between the main body 100 and the base plate 600, and elastically supporting the base plate 600.

The mounting space R of the main body 100 is formed in a predetermined size at the bottom rear portion of the main body 100.

The base plate 600 is formed in a plate shape having a predetermined thickness. The shape of the base plate 600 is equivalent to the shape of the bottom section of the mounting space R of the main body 100, and the size of the base plate 600 is smaller than that of the bottom section of the mounting space R. A plurality of through holes 601 are formed on both side ends of the base plate 600.

The compressor 300 is mounted on the top surface of the base plate 600. Elastic vibration isolation means for preventing vibration transmission by spring elasticity S are formed between the compressor 300 and the base plate 600.

The base plate 600 is installed at the lower portion of the mounting space R of the main body 100 to be positioned on the bottom surface line of the main body 100. Each side of the base plate 600 maintains a predetermined interval from the inner walls of the mounting space R.

The interval maintaining elastic support means includes fixing plates 610 coupled respectively to both side inner walls of the mounting space R of the main body 100 to be positioned at both end upper portions of the base plate 600, first axial direction support members 620 movably inserted into the fixing plates 610 and the base plate 600 and supported by the fixing plates 610, and springs S1 disposed between the first axial direction support members 620 and the base plate 600, for elastically supporting the base plate 600.

Here, the fixing plates 610 are formed in a rectangular shape having a predetermined width and length. A plurality of through holes 611 are formed on the fixing plates 610. The fixing plates 610 are coupled to both sidewalls of the mounting space R of the main body 100. The length directions of the fixing plates 610 are positioned in the front/rear direction of the main body 100. The fixing plates 610 are coupled to the sidewalls of the main body 100 in the vertical direction. The fixing plates 610 are positioned at a predetermined height from the bottom surface of the main body 100.

The fixing plates 610 can be extended and protruded from the inner walls of the mounting space R of the main body 100 and incorporated with the main body 100.

In addition, the fixing plates 610 can be coupled to both sidewalls of the main body 100 in twos, respectively. One through hole 611 is formed on each of the fixing plates 610.

Each of the first axial direction support members 620 includes an axial unit 621 having a predetermined length, a hooking head unit 622 extended from one side end of the axial unit 621 with a predetermined area, and a support nut unit 623 coupled to the other side of the axial unit 621.

In a state where the base plate 600 is positioned between the fixing plates 610 with a predetermined interval, the first axial direction support members 620 are inserted into the through holes 601 of the base plate 600 and the through holes 611 of the fixing plates 610. The hooking head units 622 are supported by the top surfaces of the fixing plates 610.

The springs S1 are inserted onto the axial units 621, and the support nut units 623 are coupled to the axial units 621, for supporting the springs S1. The springs S1 are compression springs. One sides of the springs S1 contact the bottom surface of the base plate 600, and the other sides of the springs S1 are supported by the top surfaces of the support nut units 623. On the other hand, washers 624 are preferably coupled between the support nut units 623 and the springs S1, for supporting the springs S1.

The base plate 600 is guided by the first axial direction support members 620, and elastically supported by the springs S1 at the same time. The springs S1 slightly sag due to the load of the base plate 600.

In the interval maintaining elastic support means, when vibration occurs on the base plate 600, the base plate 600 is elastically supported by the springs S1 and vibrated. Therefore, the vibration generated on the base plate 600 is absorbed by the springs S1, and thus not transmitted to the main body 100.

Figure 4:
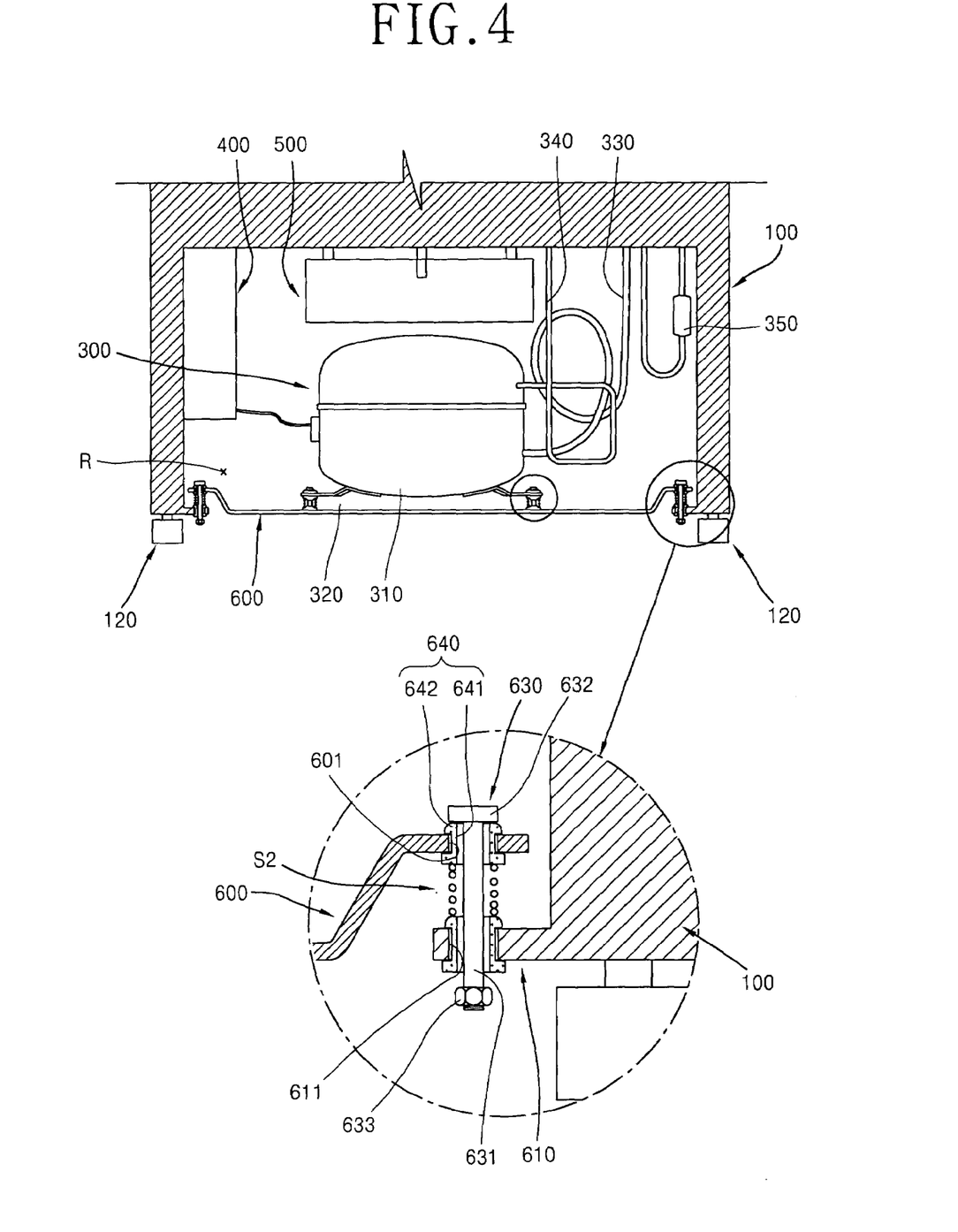
FIG. 4 is a cross-sectional view illustrating another example of an interval maintaining elastic support means of the vibration isolation apparatus for the wine refrigerator in accordance with the present invention.

FIG. 4 is a cross-sectional view illustrating another example of the interval maintaining elastic support means. As depicted in FIG. 4, the interval maintaining elastic support means includes fixing plates 610 coupled respectively to both side inner walls of the mounting space R of the main body 100 to be positioned at both end lower portions of the base plate 600, second axial direction support members 630 movably inserted into the fixing plates 610 and the base plate 600 and supported by the base plate 600, and springs S2 disposed between the base plate 600 and the fixing plates 610, for elastically supporting the base plate 600.

Here, the fixing plates 610 are formed in a rectangular shape having a predetermined width and length. A plurality of through holes 611 are formed on the fixing plates 610. The fixing plates 610 are coupled to both sidewalls of the mounting space R of the main body 100. The length directions of the fixing plates 610 are positioned in the front/rear direction of the main body 100. The fixing plates 610 are coupled to the sidewalls of the main body 100 in the vertical direction. The bottom surfaces of the fixing plates 610 are positioned on the same plane surface with the bottom surface of the main body 100.

Both side ends of the base plate 600 are partially curved so that the base plate 600 can be positioned over the fixing plates 610. The curved parts of the base plate 600 are positioned over the fixing plates 610 with a predetermined interval from the fixing plates 610.

The fixing plates 610 can be extended and protruded from the inner walls of the mounting space R of the main body 100 and incorporated with the main body 100.

In addition, the fixing plates 610 can be coupled to both sidewalls of the main body 100 in twos, respectively. One through hole 611 is formed on each of the fixing plates 610.

Each of the second axial direction support members 630 includes an axial unit 631 having a predetermined length, a hooking head unit 632 extended from one side end of the axial unit 631 with a predetermined area, and a support nut unit 633 coupled to the other side of the axial unit 631.

In a state where the base plate 600 is positioned between the fixing plates 610 with a predetermined interval, the second axial direction support members 630 are inserted into the through holes 601 of the base plate 600 and the through holes 611 of the fixing plates 610. The hooking head units 632 are supported by the top surfaces of the fixing plates 610.

When the springs S2 are inserted onto the axial units 631, the springs S2 are positioned between the base plate 600 and the fixing plates 610. The springs S2 are compression springs. One sides of the springs S2 contact the bottom surface of the base plate 600, and the other sides of the springs S2 are supported by the top surfaces of the fixing plates 610.

Preferably, rubber vibration isolators 640 for absorbing vibration are coupled between the base plate 600 and the second axial direction support members 630, and rubber vibration isolators 640 for absorbing vibration are coupled between the fixing plates 610 and the second axial direction support members 630.

Each of the rubber vibration isolators 640 includes a cylindrical unit 641 having a predetermined length, and flange units 642 extended from both ends of the cylindrical unit 641 in the horizontal direction.

One side rubber vibration isolators 640 are disposed between the inner circumferences of the through holes 601 of the base plate 600 and the outer circumferences of the axial units 631 of the second axial direction support members 630. The springs S2 and the hooking head units 632 are supported by both side flange units 642 of the rubber vibration isolators 640.

The other side rubber vibration isolators 640 are disposed between the inner circumferences of the through holes 611 of the fixing plates 610 and the outer circumferences of the axial units 631 of the second axial direction support members 630. The springs S2 are supported by one side flange units 642 of the rubber vibration isolators 640.

In the interval maintaining elastic support means, when vibration occurs on the base plate 600, the base plate 600 is elastically supported by the springs S2 and vibrated. Therefore, the vibration generated on the base plate 600 is absorbed by the springs S2, and thus not transmitted to the main body 100.

Especially, the rubber vibration isolators 640 are coupled between the second axial direction support members 630 and the base plate 600 and between the second axial direction support members 630 and the fixing plates 610, thereby efficiently absorbing vibration.

Figure 5:
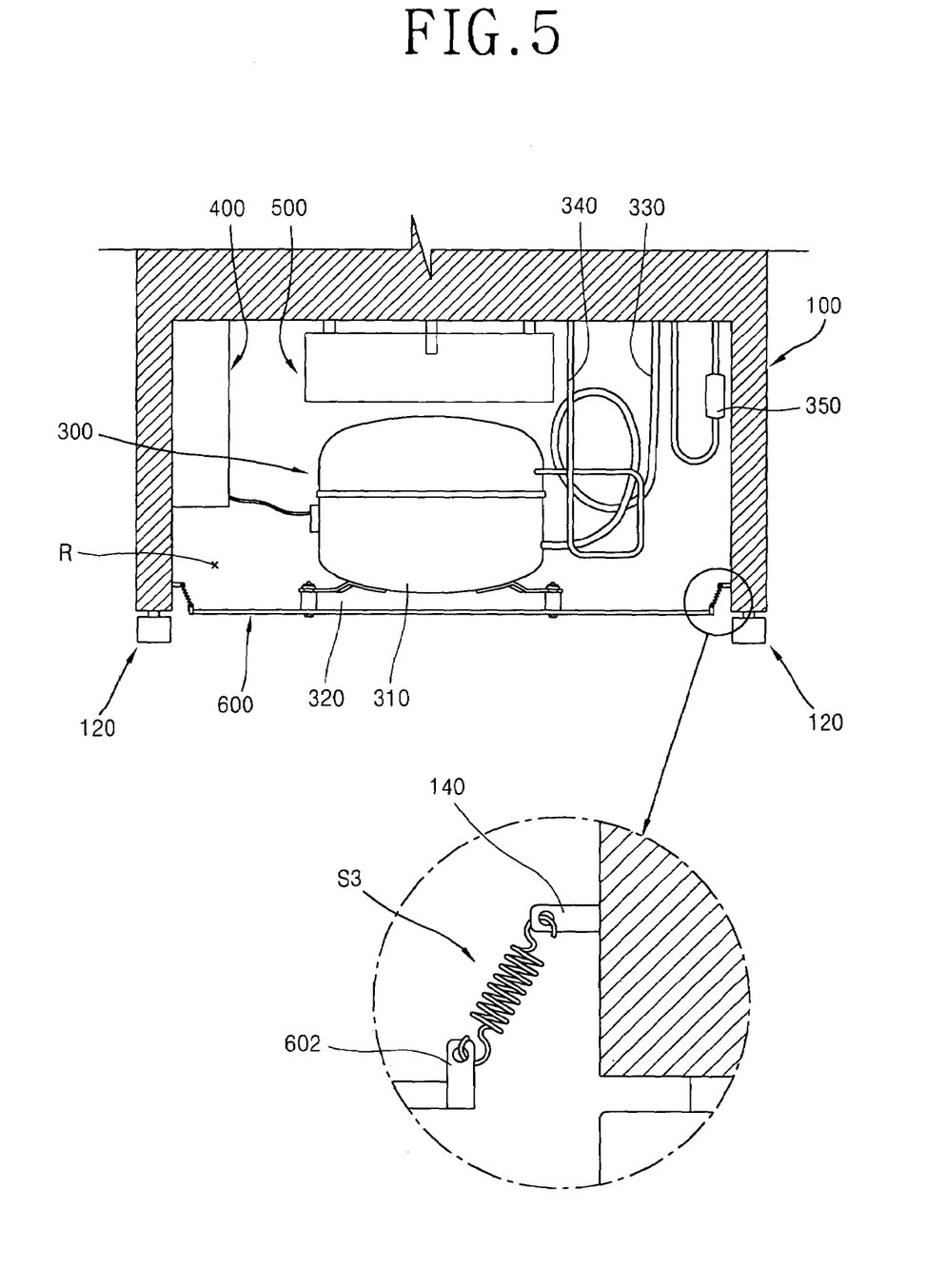
FIG. 5 is a cross-sectional view illustrating yet another example of the interval maintaining elastic support means of the vibration isolation apparatus for the wine refrigerator in accordance with the present invention.

FIG. 5 is a cross-sectional view illustrating yet another example of the interval maintaining elastic support means. As shown in FIG. 5, the interval maintaining elastic support means includes a plurality of springs S3 for connecting the main body 100 and the base plate 600. The springs S3 are tension springs.

A plurality of hooked units 140 are formed on both side inner walls of the mounting space R of the main body 100, and a plurality of hooked units 602 are formed at both side ends of the base plate 600. The hooked units 140 of the main body 100 and the hooked units 602 of the base plate 600 are formed in the same number.

The tension springs S3 are coupled to the hooked units 140 of the main body 100 and the hooked units 602 of the base plate 600. That is, one sides of the tension springs S3 are hooked on the hooked units 140 of the main body 100, and the other sides thereof are hooked on the hooked units 602 of the base plate 600. The base plate 600 is hung in the mounting space R of the main body 100 by the tension springs S3.

Preferably, the hooked units 140 of the main body 100, the hooked units 602 of the base plate 600, and the tension springs S3 are formed in fours.

In the interval maintaining elastic support means, when vibration occurs on the base plate 600, the base plate 600 is elastically supported by the springs S3 and vibrated. Therefore, the vibration generated on the base plate 600 is absorbed by the springs S3, and thus not transmitted to the main body 100.

Figure 6:
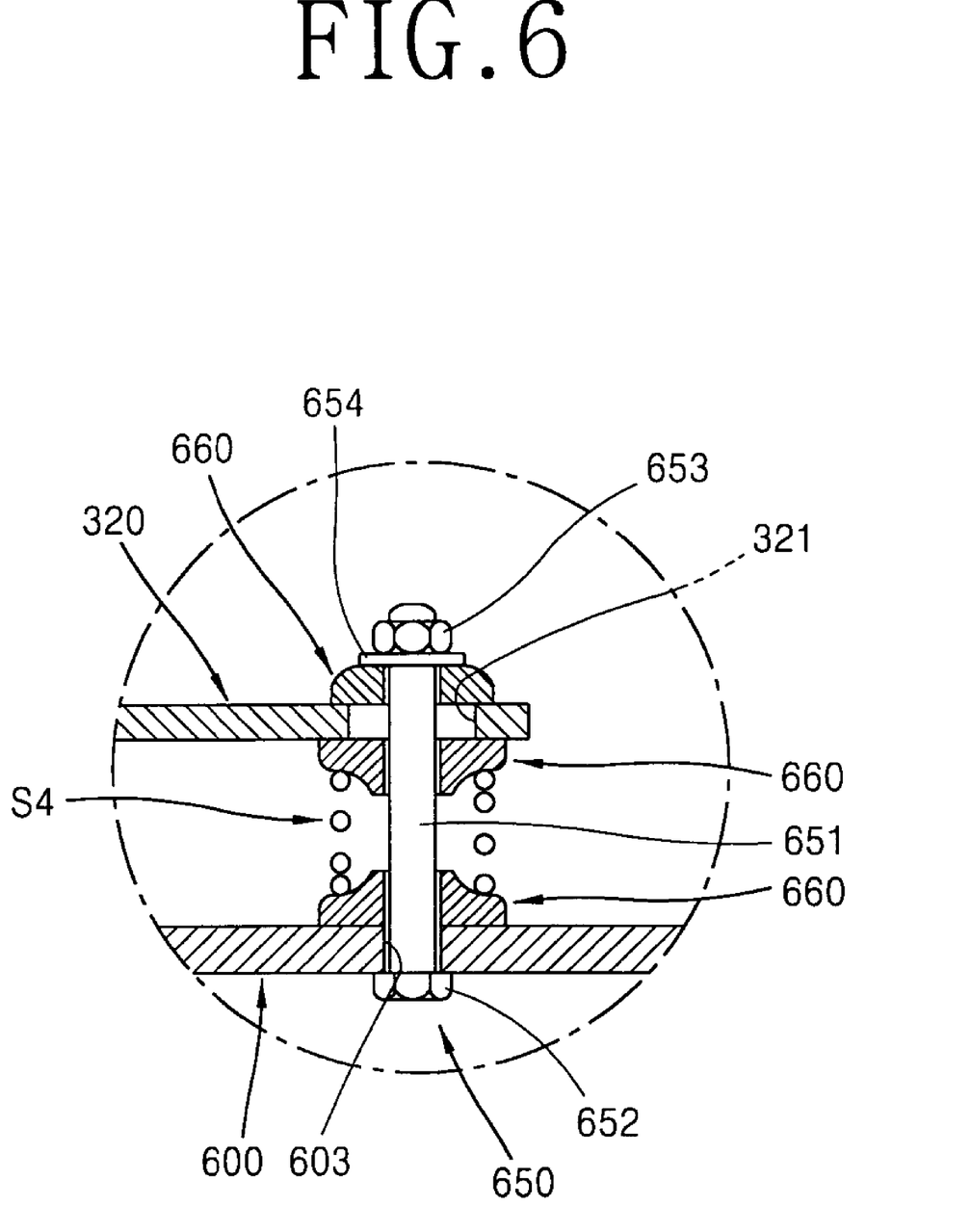
FIG. 6 is a cross-sectional view illustrating an elastic vibration isolation means of the vibration isolation apparatus for the wine refrigerator in accordance with the present invention.

On the other hand, the elastic vibration isolation means are disposed in four parts between the compressor 300 and the base plate 600. As illustrated in FIG. 6, the elastic vibration isolation means include third axial direction support members 650 inserted into the mounting plates 320 of the compressor 300 and the base plate 600, springs S4 inserted onto the third axial direction support members 650 to be positioned between the mounting plates 320 and the base plate 600, and rubber gaskets 660 disposed between the mounting plates 320 and the springs S4 and between the base plate 600 and the springs S4, for supporting the springs S4 in the axial direction.

Four mounting plates 320 are coupled to the bottom surface of the airtight vessel 310 of the compressor 300, and through holes 321 are formed on the mounting plates 320, respectively. Through holes 603 are formed on the base plate 600 facing the through holes 321 of the mounting plates 320.

Each of the third axial direction support members 650 includes an axial unit 651 having a predetermined length, a hooking head unit 652 extended from one side end of the axial unit 651 with a predetermined area, and a support nut unit 653 coupled to the other side of the axial unit 651.

The axial units 651 of the third axial direction support members 650 are inserted into the through holes 603 of the base plate 600 and the through holes 321 of the mounting plates 320, and the hooking head units 652 thereof are supported by the bottom surface of the base plate 600. The springs S4 are compression springs. When the springs S4 are inserted onto the axial units 651, the springs S4 are positioned between the top surface of the base plate 600 and the bottom surfaces of the mounting plates 320.

Through holes are formed in the rubber gaskets 660, respectively. In a state where the rubber gaskets 660 are inserted onto the axial units 651, the rubber gaskets 660 are positioned between the springs S4 and the mounting plates 320 and between the springs S4 and the base plate 600.

Preferably, the rubber gaskets 660 are coupled between the support nut units 653 and the mounting plates 320, and washers 654 are inserted between the support nut units 653 and the rubber gaskets 660.

In the elastic vibration isolation means, when the compressor 300 compresses refrigerant, if vibration occurs, the mounting plates 320 of the compressor 300 are elastically supported by the rubber gaskets 660 and the springs S4 and vibrated. Therefore, the vibration generated by the compressor 300 is absorbed by the springs S4, and thus rarely transmitted to the base plate 600.

A defrosted waterspout 500 is installed on the inside top surface of the mounting space R of the main body 100 to be positioned over the compressor 300, and a control box 400 is mounted on the sidewall of the mounting space R of the main body 100.

A cover (not shown) is coupled to the rear surface of the main body 100, for covering the mounting space R.

Front legs 120 and rear legs (not shown) are mounted on the front and rear edges of the bottom surface of the main body 100. The rear legs can be mounted on the base plate 100. The front legs 120 and the rear legs contact the bottom surface of the indoor space, for supporting the main body 100.

Reference numerals 310, 330, 340 and 350 denote an airtight vessel, a suction pipe, a discharge pipe and a dryer, respectively.

The operational effects of the vibration isolation apparatus for the wine refrigerator in accordance with the present invention will now be described.

First, in a state where wine bottles are stored in the storage chamber of the wine refrigerator, the wine refrigerator is operated. As the wine refrigerator is operated, the evaporator of the refrigeration cycle system generates cool air. The storage chamber maintains an optimum temperature by the cool air. While the compressor 300 installed in the mechanical chamber sucks, compresses and discharges the refrigerants, vibration is generated.

The vibration generated by the compressor 300 is transmitted to the base plate 600 composing the bottom surface of the mechanical chamber. The vibration transmitted to the base plate 600 is absorbed by the interval maintaining elastic support means, and thus rarely transmitted to the main body 100.

In the case that the elastic vibration isolation means are disposed between the compressor 300 and the base plate 600, the vibration generated by the compressor 300 is absorbed by the elastic vibration isolation means and then transmitted to the base plate 600. Accordingly, the vibration generated by the compressor 300 is rarely transmitted to the main body 100.

On the other hand, when a blast fan for cooling the compressor 300 is installed in the mechanical chamber, if the blast fan is installed on the base plate 600, the vibration generated by the blast fan is not transmitted to the main body 100.

As discussed earlier, in accordance with the present invention, the vibration isolation apparatus for the wine refrigerator prevents the wine bottles stored in the storage chamber of the main body from being shaken, by preventing the vibration generated by the compressor mounted on the mechanical chamber from being transmitted to the main body in the operation of the wine refrigerator. As a result, the vibration isolation apparatus for the wine refrigerator can store wines without deteriorating the special taste of the wines.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A vibration isolation apparatus for a wine refrigerator, comprising:

a main body having a storage chamber and a mounting space;

a base plate disposed at the mounting space of the main body with a predetermined interval from the main body, for forming the mechanical chamber with the mounting space, a compressor being installed on the top surface of the base plate; and an interval maintaining elastic support means for maintaining a predetermined interval between the main body and the base plate, and elastically supporting the base plate, wherein the interval maintaining elastic support means comprises:

fixing plates coupled respectively to both side inner walls of the mounting space of the main body to be positioned over the base plate;

first axial direction support members movably inserted into the fixing plates and the base plate and supported by the fixing plates; and springs disposed between the first axial direction support members and the base plate, for elastically supporting the base plate.

2. The apparatus of claim 1, wherein each of the first axial direction support members comprises:

an axial unit inserted into the fixing plate and the base plate;

a hooking head unit extended from one side end of the axial unit with a predetermined area, and hooked on the fixing plate; and a support nut unit coupled to the other side of the axial unit, for supporting the spring.

3. The apparatus of claim 2, wherein washers for supporting the springs are disposed between the support nut units and the springs.

4. The apparatus of claim 1, wherein the springs are compression springs.

5. The apparatus of claim 1, wherein the fixing plates are formed on both sidewalls of the mounting space of the main body in twos.

6. The apparatus of claim 1, wherein the fixing plates are extended and protruded from both side inner walls of the mounting space of the main body.

7. The apparatus of claim 1, wherein elastic vibration isolation means for preventing vibration transmission by spring elasticity are disposed between the compressor and the base plate.

8. The apparatus of claim 7, wherein the elastic vibration isolation means comprise:
   third axial direction support members inserted into the mounting plates of the compressor and the base plate;
   springs inserted onto the third axial direction support members to be positioned between the mounting plates and the base plate, for elastically supporting the mounting plates; and
   rubber gaskets disposed between the mounting plates and the springs and between the base plate and the springs, for supporting the springs.

9. The apparatus of claim 8, wherein each of the third axial direction support members comprises:
   an axial unit inserted into the base plate and the mounting plate;
   a hooking head unit extended from one side end of the axial unit with a predetermined area, and hooked on the base plate; and
   a support nut unit coupled to the other side of the axial unit, and hooked on the mounting plate.

10. The apparatus of claim 9, wherein the rubber gaskets are coupled between the support nut units and the mounting plates.

11. A vibration isolation apparatus for a wine refrigerator, comprising:
   a main body having a storage chamber and a mounting space;
   a base plate disposed at the mounting space of the main body with a predetermined interval from the main body, for forming the mechanical chamber with the mounting space, a compressor being installed on the top surface of the base plate; and
   an interval maintaining elastic support means coupled between the main body and the base plate, for maintaining a predetermined interval between the main body and the base plate, and elastically supporting the base plate, wherein the interval maintaining elastic support means comprises:
      fixing plates coupled respectively to both side inner walls of the mounting space of the main body to be positioned over the base plate;
      first axial direction support members movably inserted into the fixing plates and the base plate and supported by the fixing plates; and
      springs disposed between the first axial direction support members and the base plate, for elastically supporting the base plate, and
   wherein each of the first axial direction support members comprises:
      an axial unit inserted into the fixing plate and the base plate;
      a hooking head unit extended from one side end of the axial unit with a predetermined area, and hooked on the fixing plate; and
      a support nut unit coupled to the other side of the axial unit, for supporting the spring
      a washer disposed between the support nut units and the springs for supporting the spring.

* * * * *